Feb. 7, 1961 H. T. HUNTER 2,970,563
COATING APPARATUS FOR COMESTIBLES
Filed Oct. 16, 1957 5 Sheets-Sheet 1

INVENTOR
HERBERT T. HUNTER
BY
William R. Liberman
ATTORNEY

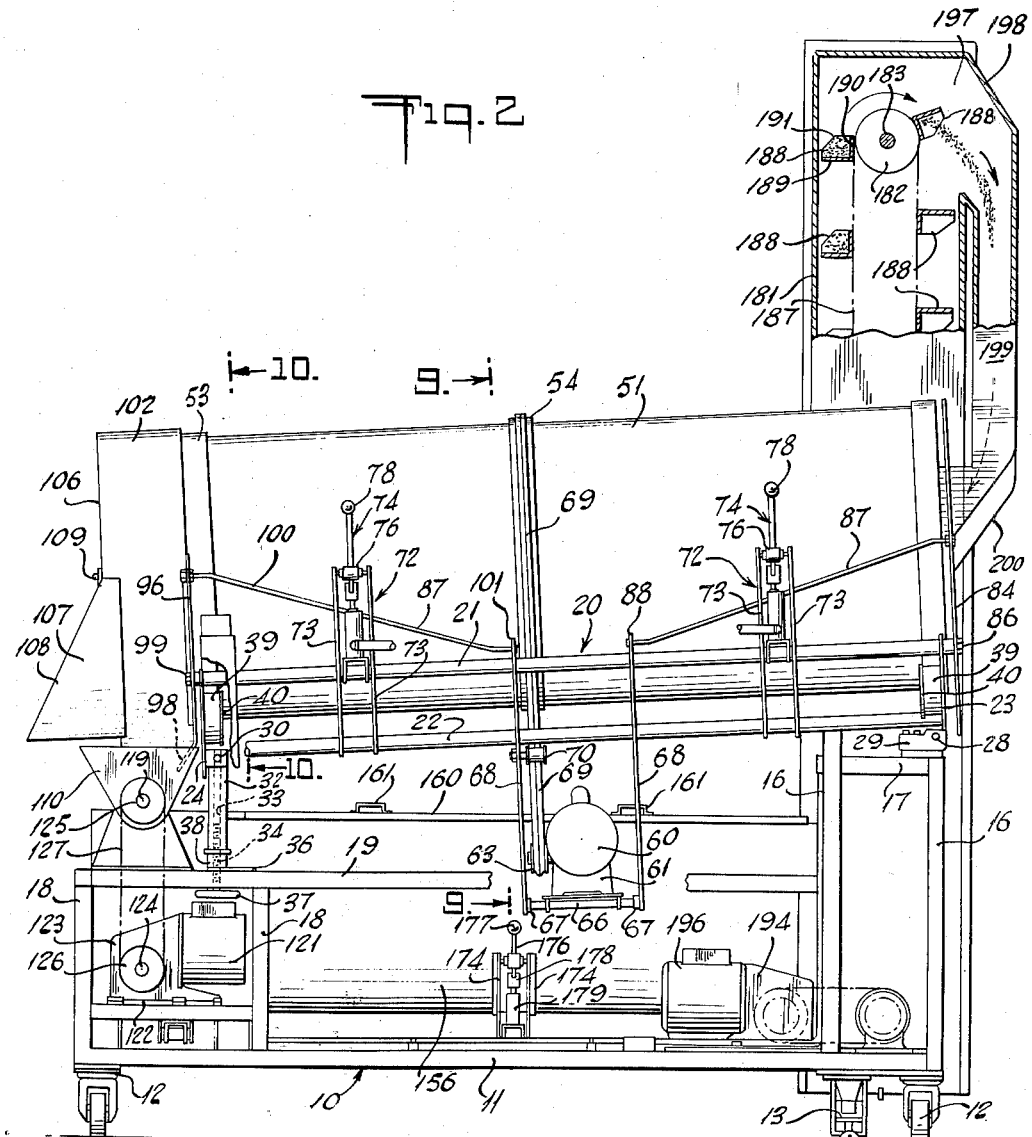

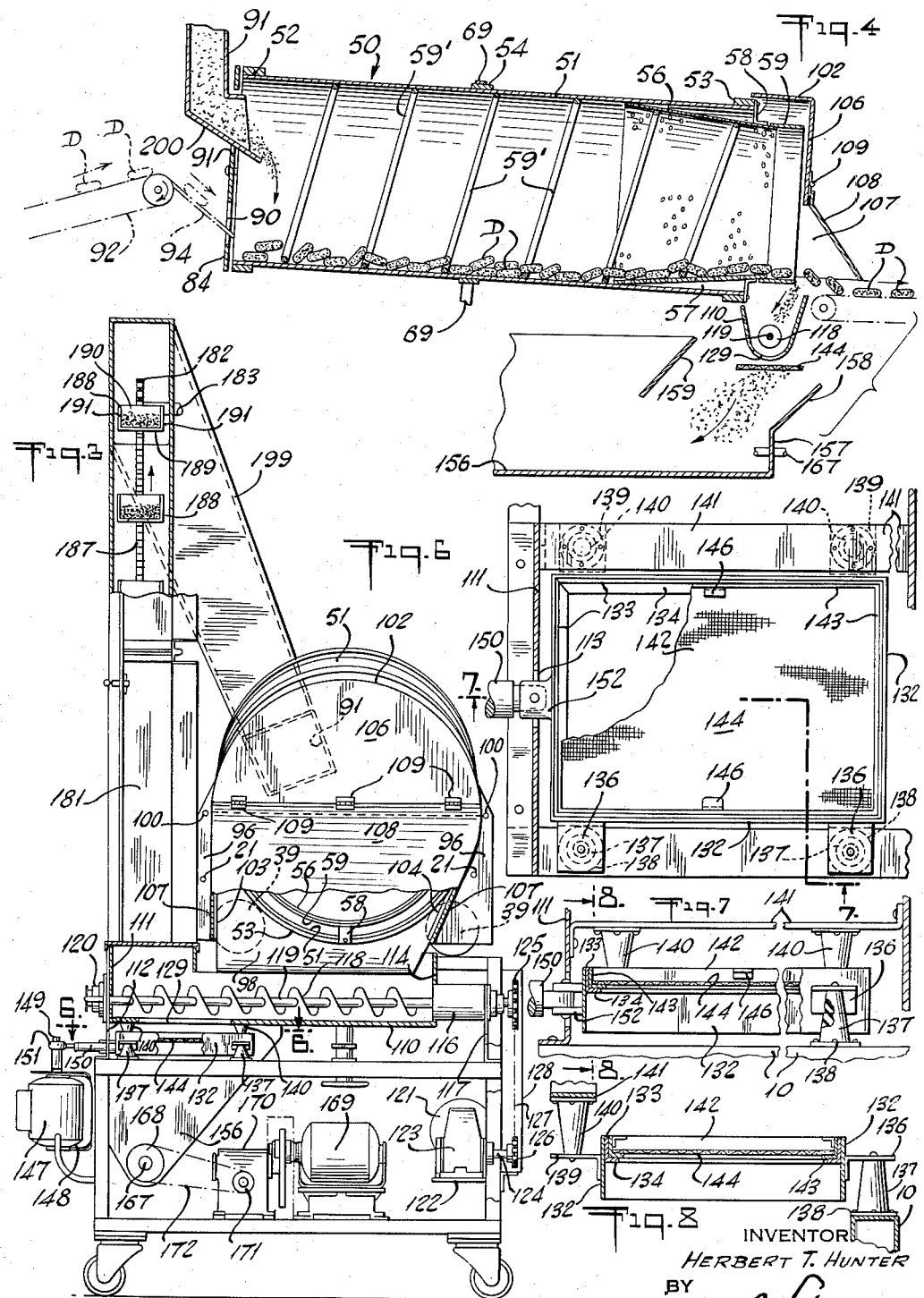

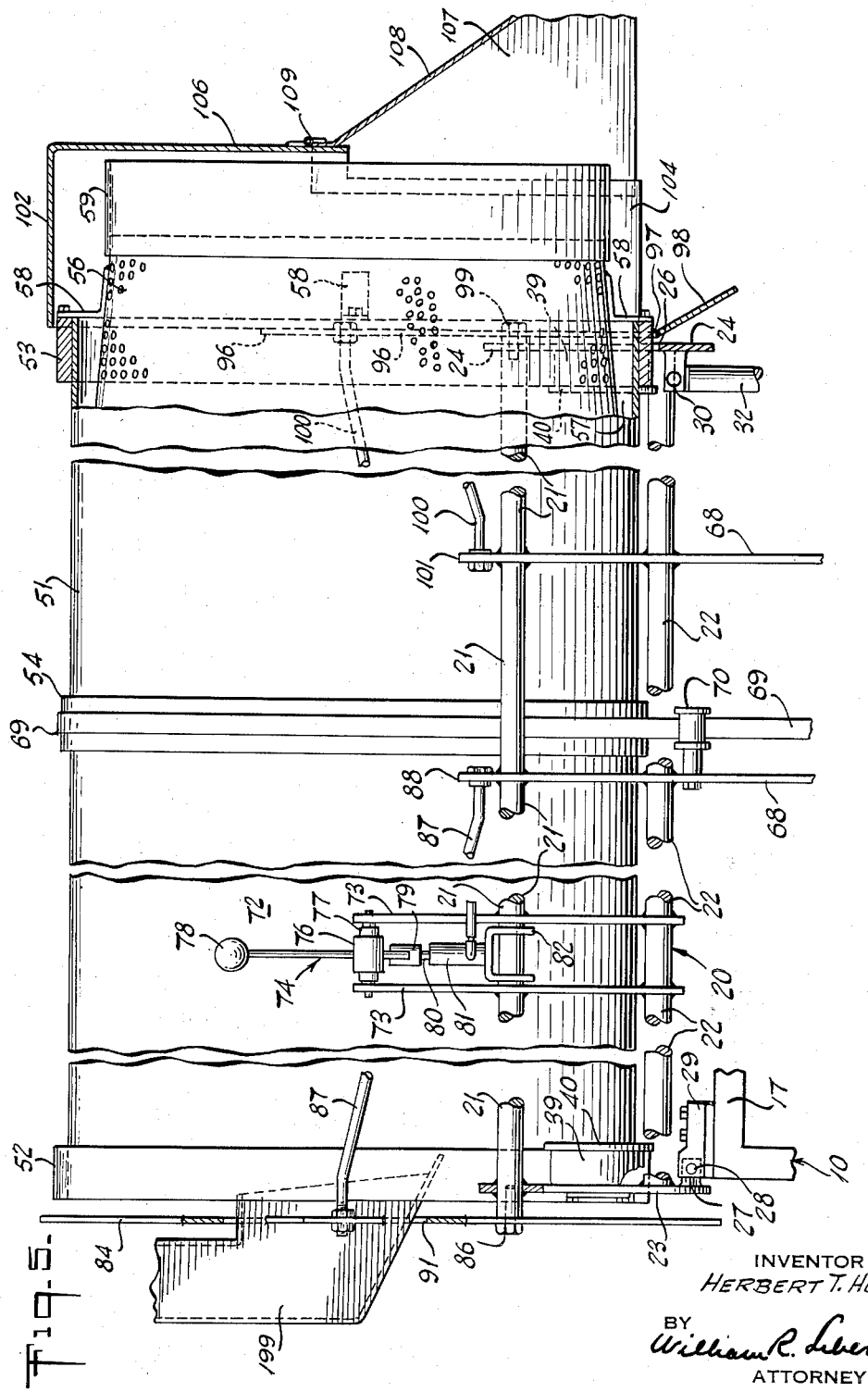

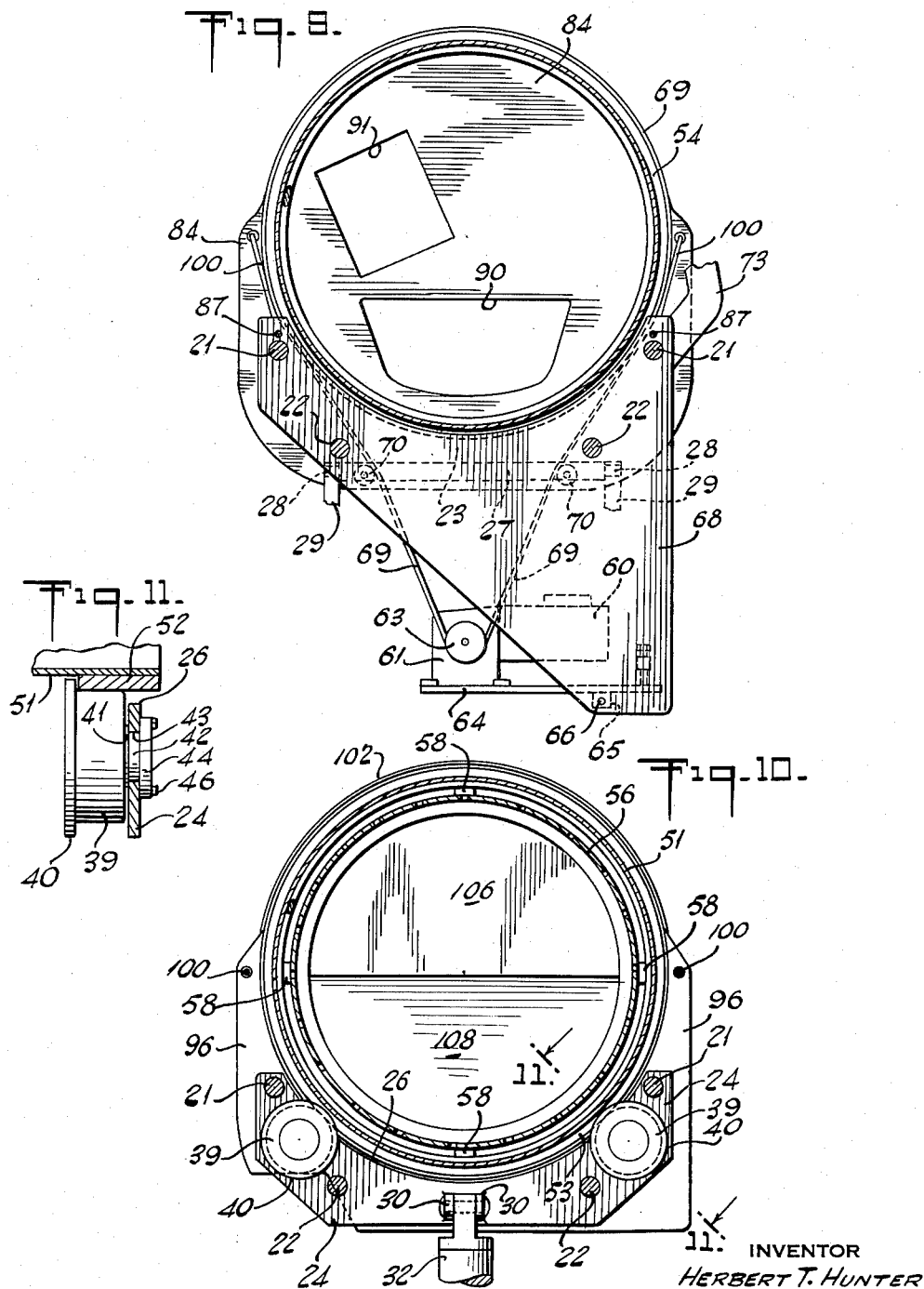

United States Patent Office 2,970,563
Patented Feb. 7, 1961

2,970,563

COATING APPARATUS FOR COMESTIBLES

Herbert T. Hunter, Catonsville, Md., assignor to DCA Food Industries Inc., New York, N.Y., a corporation of New York Filed Oct. 16, 1957, Ser. No. 690,482

4 Claims. (Cl. 118—19)

The present invention relates generally to an improved apparatus for the treatment of comestibles, and it relates more particularly to an improved apparatus for the coating of baked products, such as doughnuts, crullers, or the like, with granular and pulverant materials, such as the conventional sugar dusting powders.

The present application is a continuation-in-part of the copending application of Herbert T. Hunter, Serial No. 537,763, filed September 30, 1955, now U.S. Patent No. 2,897,772, issued Aug. 4, 1959.

It is a conventional practice in the coating of doughnuts and similar baked products with sugar dusting powders to tumble the doughnuts and dusting powder in a rotating drum while advancing the doughnuts from the feed end through the discharge end of the drum. Any of the free dusting powder which emerges from the discharge end of the drum is generally transported to and introduced in the feed end of the drum and recirculated. The apparatus heretofore employed for applying dusting powders to doughnuts possess numerous drawbacks and disadvantages. They are inefficient and require considerable personal attendance and attention. In addition, they are highly inflexible and difficult to service and clean.

It is thus a principal object of the present invention to provide an improved apparatus for the treatment of comestibles.

Another object of the present invention is to provide an improved apparatus for coating doughnuts and other cakes and baked products with granular and pulverant materials, such as sugar dusting powders.

Still another object of the present invention is to provide an improved cake dusting apparatus characterized by its high efficiency and flexibility.

A further object of the present invention is to provide an improved cake dusting apparatus which requires a minimum of personal attendance and is simple to service and clean.

Still a further object of the present invention is to provide an improved cake dusting apparatus of simple and rugged construction.

The above and other objects of the present invention will become apparent from a reading of the following description, taken in conjunction with the accompanying drawings, wherein Figure 1 is a front elevational view of the improved apparatus, shown partially in section and partially broken away;

Figure 2 is a rear elevational view of the improved apparatus, shown partially in section and partially broken away;

Figure 3 is a discharge end elevational view of the improved apparatus, shown partially in section and partially broken away;

Figure 4 is a longitudinal sectional view of the drum and bin portion of the improved apparatus, illustrated partially broken away;

Figure 5 is an enlarged detail view, partially broken away, of the drum and supporting cradle;

Figure 6 is a sectional view taken along line 6—6 in Figure 3, illustrating the shifting device;

Figure 7 is a sectional view taken along line 7—7 in Figure 6;

Figure 8 is a sectional view taken along line 8—8 in Figure 7;

Figure 9 is a sectional view taken along line 9—9 in Figure 2;

Figure 10 is a sectional view taken along line 10—10 in Figure 2; and

Figure 11 is a sectional view taken along line 11—11 in Figure 10.

Figure 1:
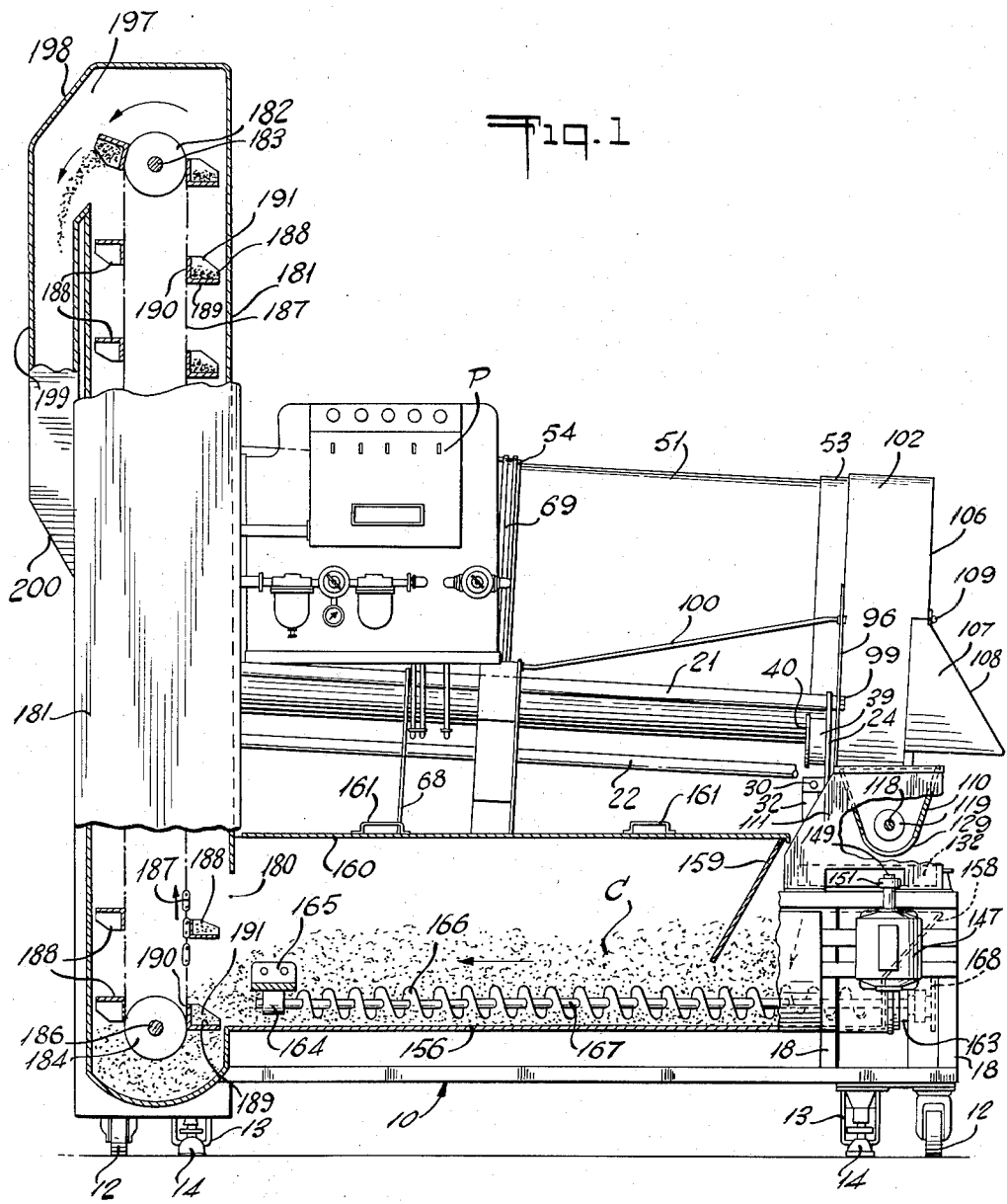

Briefly, the present invention contemplates the provision of an improved apparatus for applying a finely divided material to a comestible comprising a longitudinally extending rotatable drum having a feed opening and a discharge opening; means adjacent said discharge opening for separating the non-adhering finely divided material from the comestible; a longitudinally extending bin located below said drum and having a leading end and a trailing end disposed adjacent to the said drum discharge opening and feed opening respectively; a sifter located between said drum discharge opening and said bin leading end; a first endless conveyor adapted to transport finely divided material from the leading end toward the trailing end of said bin; and a second endless conveyor adapted to transport said finely divided material from the trailing end of said bin into the feed opening of said drum.

In accordance with a preferred embodiment of the present invention, there is provided a movable support frame carrying a cradle pivoted about a horizontal pin at one end and of adjustable height at the other end to permit a variation in the inclination of the cradle. The cradle is provided with rollers upon which is seated and rests a longitudinally extending inclined rotatable drum having a feed opening at its elevated end and a discharge opening at its lower end. A motor platform is carried by the cradle and rotates the drum by way of a belt extending about the drum. Nesting in the discharge end of the drum is a perforated frusto-conical insert carrying a leading imperforate collar and the drum and insert are lined with a helical rod. A trough, located below the discharge end of the drum, is provided with a worm advancing toward a discharge opening in the bottom of the trough. Disposed below the trough discharge opening is a vibrating sifter located above an opening in a longitudinally extending powder bin. A screw advances the bin contents from the sifter end to the opposite end where a bucket elevator raises the powder and deposits it in a chute discharging into the feed opening of the drum.

Referring now to the drawings which illustrate a preferred embodiment of the present invention, the numeral 10 generally designates the principal support framework, including a bottom rectangular frame 11 having suitable casters 12 depending from the corners thereof to impart mobility to the apparatus. Depending from the base frame 11 adjacent a pair of the casters 12 is a pair of pedestals 13 provided with foot pieces 14 movable between positions below and above the level of the underface of the wheels of the casters 12 to selectively, firmly fix the apparatus in any desired location. Adjacent to one end of the base frame 11 are located two laterally spaced pairs of longitudinally spaced upright columns 16 which support a platform frame 17, and at the opposite end of the base platform 17 are two laterally spaced pairs of longitudinally spaced columns 18 connected by suitable cross pieces and by longitudinally extending structural members 19 which extend to the inner columns 16.

The carriage or cradle 20 includes upper and lower pairs of longitudinally extending rods or bars 21 and 22 respectively which have their opposite ends suitably affixed to parallel end plates 23 and 24 respectively, the upper edges of the end plates 23 and 24 being of upwardly directed, concave, arcuate configuration, as at 26. The outer ends of the bars 21 project beyond the respective plates 23 and 24 and are provided with tapped axial bores.

The trailing end of the cradle 20 is hinged to the support frame 10 by means of a transversely extending horizontal cross bar 27 affixed to the inner face of the end plate 23 along the lower edge thereof by welding or other suitable means, the cross bar 27 terminating at opposite ends in stub shafts 28. Mounted on the upper frame 17 are a pair of laterally spaced pillow blocks 29 which rotatably engage the stub shafts 28 to afford a hinged connection between the end plate 23 and the support frame thereby permitting the swinging of the cradle 20 about a horizontal axis. In order to permit the fine adjustment of the angle of inclination of the cradle 20, there is provided a yoke-shaped bracket 30 affixed to the inner face of the forward end plate 24 midway between the side edges and slightly above the lower edge thereof. A jack shaft 32 is pin-connected at its upper end to the yoke bracket 30 and is provided with a tapped axial bore 33 extending through the lower end of the jack shaft 32. A screw member 34 is rotatably carried by a cross plate 36 mounted on the frame members 19 and is provided with a threaded shank which engages the jack shaft tapped bore 33 and with a hand wheel 37 disposed below the cross plate 36. A hand-lock nut 38 engages the screw threaded shank between the cross plate 36 and the shaft 32. The above arrangement permits the adjustment of the inclination of the carriage 20 and the fixing thereof in any desired position.

In order to rotatably support the drum, each of the end plates 23 and 24 rotatably carries on its inner face between adjacent rods 21 and 22 a pair of laterally spaced support wheels 39 provided with peripheral flanges 40 along the edge remote from the respective plates 23 and 24. Each of the wheels 39 is mounted on a stub shaft 41 by means of a suitable bearing, the stub shaft passing through an eccentric opening formed in a bushing 42 which registers with the corresponding aperture 43 formed in the respective end plate 23 or 24 and engaging a rotatably adjustable base plate 44. The peripheral surface of the wheel 39 is disposed above the arcuate edge 26 of the end plate 23 or 24 and its elevation relative thereto may be adjusted by rotation of the base plate 44 and securing the base plate in any desired position by the securing bolts 46.

The tumbling drum is generally designated by the numeral 50 and includes a longitudinally extending, hollow, cylindrical shell 51 provided with track collars 52 and 53 at the trailing and leading outer peripheral edges of the shell 51 and a belt-engaging collar 54 at a point intermediate the ends of the shell 51. The drum 50 rests in the cradle 20, the collars 52 and 53 engaging corresponding wheels 39, the inner edges of the collars confronting the inner edges of the wheel flanges 40, being closely spaced relative thereto. Thus, the drum 50 is rotatably supported in the carriage 20 and is angularly adjustable therewith.

A tubular perforated insert 56 of frusto-conical configuration is located within the leading portion of the drum shell 51 and extends beyond the forward edge thereof. The base of the insert 56 abuts the inner face of the shell 51 and the wall thereof tapers forwardly inwardly to provide a peripheral space 57 between the confronting walls of the shell 51 and the insert 56. A plurality of angle-shaped brackets 58 are located on and circumferentially spaced along the periphery of the insert 56 and are provided with outwardly projecting legs which are removably secured to the barrel collar 53 by means of bolts. A tubular imperforate sleeve 59 is affixed to the leading edge of the insert 56 encircling the outer face thereof and projects forwardly of said leading edge. A helically formed rod 59 of substantially circular cross section is removably nested within the shell 51 and the perforated insert 56, extending substantially from the feed end to the discharge end of the drum 50.

In order to rotate the drum 50, there is provided an electric drive motor 60 connected by way of a speed reducing unit 61 to a pulley 63. The motor 60 and the speed reducing unit 61 are mounted at the forward end of a base plate 64, the rear portion of which is provided with a pair of laterally spaced depending brackets 65 which are provided with aligned openings rotatably registering with a transversely extending axle 66. The axle 66 is mounted between a pair of bushings 67 located at the lower ends of the confronting faces of a pair of longitudinally spaced support plates 68, which are provided with openings registering with the rods 21 and 22, and are secured thereto by welding or the like to reinforce the carriage 20. The plates 68 are provided with upwardly directed, arcuate recesses to provide clearance for the drum 50 and include a vertical forward edge and a downwardly forwardly inclined rear edge.

An endless drive belt 69 passes around the barrel collar 54 and engages the drive pulley 63. The weight of the motor 60 and the gear reduction 61 urge the pulley 63 downwardly about the axle 66 to impart suitable tension to the drive belt 69. A pair of flanged idler pulleys 70 are mounted, by way of suitable supports and spacers, on a support plate 68 and engage the drive belt 69 so as to direct the belt along a path clearing the rods 21 and 22.

A pair of drum-jarring mechanisms 72, as seen in Figure 5 of the drawings, are carried by the cradle rods 21 and 22 and are located on opposite sides of the motor bracket support plates 68. The purpose of the mechanisms 72 is to dislodge any of the powder or granulated material which may tend to adhere to the walls of the drum 50 and to maintain the same in a free flowing state. Each of the jarring mechanisms 72 includes a pair of laterally spaced parallel arms 73 having aligned apertures formed therein registering with the cradle rods 21 and 22, the arms 73 being secured to the rods 21 and 22 by welding or the like.

A bell crank 74 is provided with a transverse bearing member 76 at the elbow portion thereof, the bearing member 76 rotatably engaging a transverse axle 77 which is supported by and between the upper free ends of the arms 73. The upper arm of the bell crank 74 terminates in a suitable hammer head 78 and the lower arm thereof is pin-connected to a yoke 79 carried on the upper end of a piston rod 80 associated with a pneumatic cylinder 81. The pneumatic cylinder 81 is mounted on the bridge portion of a U-shaped bracket 82 having vertical legs provided with aligned openings which rotatably engage the cradle rod 21 between the pair of arms 73. The cylinder 81 is connected to a source of compressed air to effect the periodic actuation of the cylinder 81 to thereby regularly actuate the bell crank 74 causing the hammer head 78 to strike the drum shell 51.

Located adjacent to and confronting the feed end of the drum 50 is a cover plate 84 whose periphery extends radially beyond the walls of the drum 50. The cover plate 84 is mounted on the cradle 20, being fastened to the trailing ends of the rods 21 by means of bolts 86 having shanks passing through corresponding openings in the cover plate 84 and engaging the tapped axial bores formed in the trailing ends of the rods 21. The support of the plate 84 is further reinforced by a pair of tie rods 87 having threaded ends passing through openings formed in the cover plate 84 and in ears 88 projecting upwardly from the motor bracket support plate 68. The threaded ends of the tie rods 88 are engaged by suitable nuts to effect the adjustable securement thereof.

Lower and upper openings 90 and 91 respectively are formed in the cover plate 84, the opening 90 being of roughly trapezoidal configuration and located medially with respect to the vertical axis of the cover plate 84, and the opening 91 being of inclined rectangular configuration and disposed in offset relationship with respect to the vertical horizontal axis of the cover plate 84. The lower opening 90 permits the introduction of the products to be coated, for example, doughnuts or the like, which may be fed therethrough by means of an endless conveyor 92 terminating at a chute 94 directed into the opening 90. The opening 91 permits the introduction of the coating material, as will be hereinafter set forth.

A front cover assembly is located at the leading or discharge end of the drum 50 and includes a support plate 96. The support plate 96 is located immediately rearward of the leading edge of the drum shell 51 and has an upwardly directed, arcuate recess 97 formed therein which registers with and is slightly spaced from approximately the lower half of the front barrel collar 53. Depending from the lower edge of the support plate 96 is a forwardly downwardly inclined lip 98. The support plate 96 is mounted on the cradle 20 by means of a pair of bolts 99 passing through openings formed in the support plate 96 and engaging the corresponding tapped axial bores formed in the leading ends of the cradle rods 21. A pair of tie rods 100 extend from an ear projecting upwardly from the motor bracket support plate 68 to the upper border of the support plate 96, being adjustably secured thereto by means of suitable nuts.

A band 102 is spaced from and encircles the upper portion of the drum 50 and extends forwardly from a point rearward of the leading edge of the drum collar 53 to a point slightly forward of the leading edge of the imperforate collar 59. The band 102 is provided with a vertically depending section 103 and an inwardly downwardly inclined section 104 which extends to a point immediately below the lower edge of the drum 50. The trailing edges of the band sections 103 and 104 are secured by welding or the like to the front face of the support plate 96, and a cover plate 106 of approximately semi-circular configuration is secured to the front edge of the semi-circular band 102, the lower edge of the cover plate 106 being horizontal. A hood or canopy is hinged to the lower border of the cover plate 106 and includes a pair of substantially triangular end plates 107 having vertical trailing edges normally disposed rearward of the cover plate 106 and the lower horizontal edge normally disposed at the level of the lower edge of the drum 50. A top forwardly downwardly inclined wall 108 is secured to the upper diagonal edges of the end plates 107 and is provided with an upper edge which is connected to the cover plate 106 by way of a plurality of laterally spaced hinges 109 which permits the upward swinging of the hood.

A hopper-shaped trough 110 is located directly below the discharge end of the drum 50 and extends transversely from below the drum 50 to the front of the apparatus. The forward end of the trough 110 is provided with an end plate 111 sealing the forward end of the trough 110, the end plate 111 having depending legs 112 separated by an intervening space 113 and secured to the support frame 10. The trailing end of the trough 110 is provided with a triangular-shaped end wall 114 which is secured to a bearing block frame 116 supported by a bracket 117 mounted on the support frame 10. The support plate lip 98 extends into the trough 110.

Located longitudinally within and along the base of the trough 110 is a worm or screw 118 having a longitudinal shaft 119 which extends through aligned openings formed in the trough end walls 111 and 112, the forward end of the shaft 119 being rotatably engaged by a bearing member 120 mounted on the outer face of the end plate 111. The trailing end of the shaft 119 is rotatably engaged by the bearing block frame 116 and has a sprocket wheel 125 affixed to its free end. An electric drive motor 121 is mounted on a motor bracket 122 carried by the support frame 10 and is connected by way of a speed reducer unit 123 to a driven shaft 124, to which is affixed a sprocket wheel 126. The sprocket wheel 126 is coupled by way of a sprocket chain 127 to the sprocket wheel 125, and a chain guard 128 suitably mounted on the support frame 10 encloses the sprocket wheels 125 and 126 and the sprocket chain 127.

A sifting mechanism is located below a discharge opening 129 formed in the forward bottom portion of the trough 110, and includes a rectangular box frame 132 located directly below the discharge opening 129. An angle member 133, having an inwardly directed leg 134, is coextensive with and affixed to each of the inner walls of the box frame 132 below the upper edge thereof, the inwardly directed legs 134 defining a screen supporting peripheral shelf. A pair of laterally spaced angle brackets 136 are mounted on the outer face of the forward wall of the box frame 132 and are provided with forwardly directed legs, which are secured to the top faces of corresponding resilient upright frusto-conical rubber mounts 137 of conventional construction having peripheral base flanges 138 which are secured to a cross piece of the support frame 10.

Mounted on the rear wall of the box frame 132 are a pair of angle brackets 139, which are provided with rearwardly directed legs secured to the underface of rubber mounts 140, similar in construction to the mounts 137, and fastened to and depending from a cross bar 141. The cross bar 141 has one end thereof secured to the trough end plate 111 and the other end thereof otherwise suitably supported. A removable sieve 142 nests in the box frame 132, resting on the peripheral shelf 134. The sieve 142 includes a rectangular frame formed of angle members 143 and is of such dimensions as to permit the nesting thereof within the box frame 132 upon the shelf 134. A screen 144 is carried by the angle members 143 and a pair of inwardly directed ears 146 are affixed to the upper edges of opposing edges of opposite angle members 143 to facilitate the removal of the sieve 142 from the box frame 132 and the cleaning and replacement thereof.

The mechanism for imparting a vibratory motion to the box frame 132 and the sieve 142 includes an electric motor 147 having a vertical drive shaft which projects upwardly and is mounted on the support frame 10 by means of a U-shaped motor bracket 148. Affixed to the drive shaft of the motor 147 is a tubular cap having an upwardly directed eccentric pin 149. A connecting rod 150 of adjustable length carries a bearing member 151 at its outer end which rotatably engages the eccentric pin 149. The connecting rod 150 passes through the opening 113 formed in the trough end plate 111 and is pin-connected at its inner end between the horizontal arms 152 of a bracket secured to an end face of the box frame 132. Thus, upon energization of the electric motor 147, a vibratory motion is imparted to the sieve 142 by way of the eccentric pin 149, connecting rod 150 and box frame 132.

Located along the front of the apparatus and supported on the frame 10 below the drum 50 is a hopper-shaped trough or bin 156 extending longitudinally from a point below the discharge end of the drum 50 to a point approximately below the feed end thereof, the feed end of the bin 156 being adjacent the discharge end of the drum 50 and the discharge end of the bin 156 being adjacent the feed end of the drum 50. The bin 156 at its feed end is provided with an upwardly extending wall 157 carrying a forwardly upwardly inclined section 158 which extends to a point below and forward of the sifting mechanism box frame 132. A partition 159 is located rearwardly of the section 158 and extends downwardly and rearwardly from the upper edge of the bin 156 to a point approximately halfway to the bottom thereof so as to provide communication between the sifting mechanism and the interior of the bin 156. A suitable removable lid 160 covers the bin from the partition 159 to the discharge end of the bin 156 and is provided with a pair of handle members 161 to facilitate the removal of the lid 160.

A first bearing member 163 is carried on the outer face of the bin end wall 157 and is in longitudinal alignment with the second bearing member 164 carried on the bracket 165 supported by the walls of the bin 156. Extending longitudinally along the trough of the bin 156 is a worm or screw member 166 having an axial shaft 167 rotatably registering with the bearings 163 and 164, the trailing end of the shaft 167 projecting beyond the bearing 163 and having a sprocket wheel 168 affixed thereto. An electric drive motor 169 is mounted by way of a suitable support bracket on the frame 10 and is coupled to the input shaft of a speed reducing unit 170 likewise mounted on the support 10. The driven shaft of the speed reducing unit 170 is provided with a sprocket wheel 171 which is coupled to the worm sprocket wheel 168 by means of a suitable sprocket chain 172.

A bin-jarring mechanism is mounted on the support frame 10 and includes a bracket having a pair of laterally spaced arms 174 carrying between their upper ends an axle which engages the knee bearing of a bell crank 176. The upper arm of the bell crank 176 carries a hammer head 177 and the lower arm of the bell crank 176 is pin-connected to the upper end of a piston rod 178. The piston rod 178 registers with a suitably supported pneumatic cylinder 179 which is connected to a source of compressed air to impart a rocking motion to the bell crank 176 and effect the hammering of the wall of the bin 156 to prevent the adherence of material thereto and maintain the material in a free flowing state.

The discharge end of the bin 156 is defined by an opening 180 formed in the side wall of a vertical housing or conduit 181, which extends from a point below the bottom of the bin 156 to a point substantially above the upper end of the drum 50. Housed within the conduit 181 is an elevator which includes an upper freely rotatable sprocket wheel 182 carried on an axle 183 and a lower sprocket wheel 184 affixed to a shaft 186. Carried by and between and engaging the sprocket wheels 182 and 184 is an endless sprocket chain 187. A plurality of buckets 188 are regularly spaced along the sprocket chain 187 and each is defined by a base 189, a rear upright wall 190 and end walls 191. The lower shaft 186 projects through an end wall of the housing 181 and has affixed thereto a sprocket wheel which is coupled by a sprocket chain to a sprocket wheel affixed to the driven shaft of a speed reducer unit 194 mounted on the frame 10 and driven by an electric motor 196. The shaft 186 is so rotated that the sprocket chain 187 advances in a counterclockwise direction, as viewed in Figure 1 of the drawing.

A discharge opening 197 is formed in the upper part of the rear wall of the housing 181 extending to a point below the upper sprocket wheel 182. Communicating with the opening 197 by way of an inwardly directed leg 198 is a downwardly rearwardly extending chute or conduit 199, terminating at its lower end in a forwardly downwardly directed funnel-shaped leg 200 which projects into the drum 50 by way of the opening 91 formed in the trailing end wall 84.

In operation, the various electric motors 60, 121, 147 and 196 are energized by way of the controls on the panel board P and the pneumatic cylinders 81 and 179 are likewise energized. The drum 50 is thus slowly rotated about its axis on the cradle 20 by way of the drive belt 69. The direction of rotation of the drum 50 is clockwise, as viewed in Figure 3 of the drawing, so that helical insert 59 conveys forwardly. The screw or worm 118 is rotated to advance towards the discharge opening 129 and the screw or worm 166 is rotated to advance to the discharge end of the bin 156 as defined by the opening 180.

The energization of the motor 147 vibrates the sifting mechanism including the sieve 142. The buckets 188 are conveyed by the sprocket chain 187 upwardly facing the leading end of the drum 50 and downwardly along its opposite vertical run.

The lid 160 is then removed from the bin 156 and the bin is loaded with a dusting composition or powder C. The rotating worm 166 advances the powder C through the opening 180 into the well in the bottom portion of the conduit or housing 181. As the buckets 188 enter the lower part of the housing 181 and travel around the circular end run about the sprocket wheel 84 and then upwardly, each of the buckets 188 scoops up a load of powder C. The buckets carrying the loads of powder C, and conveyed upwardly along the forward vertical flight, are then carired along the circular upper end run about the upper sprocket wheel 132 to fling the carried load of powder C through the discharge opening 197 into the conduit arm 198. The powder falls through the conduit 199 by way of the leg 200 through the opening 91 in the end plate 84 into the feed end of the drum 50.

Also delivered into the feed end of the drum 50 through the opening 90 in the end plate 84 are doughnuts or other comestibles D which are carried by the endless conveyor 92 and introduced into the drum 50 through the chute or ramp 94. The powder C and doughnuts D are tumbled in the rotating drum 50 and are advanced from the feed end to the discharge end thereof by reason of the inclination of the drum 50 and the helical member 59. The rate of advance of the comestibles through the drum 50 may be adjusted by varying the angle of inclination of the drum 50 by way of the jack mechanism. The powder and coated doughnuts D approach the discharge end of the drum 50 and travel along the perforated insert 56. As the powder and doughnuts traverse the perforated insert 56, a separation is effected between the loose or non-adhering powder C and the doughnuts D, the loose powder C passing through the openings in perforated insert 56 into the lower space 57 between the confronting faces of the insert 56 and the drum shell 51. The coated doughnuts pass along the length of the insert 56 and the collar 59 and emerge through the discharge opening defined by the forward edge of the collar 59 and are deposited on an endless conveyor which carries them from the apparatus. A stationary downwardly inclined grate may be disposed between the free edge of the collar 59 and the top run of the endless conveyor to guide the doughnuts to the conveyor.

The powder C which passes into the space 57 and which spills over the edge of the collar 59 falls into the trough 110 and is conveyed by the worm 118 to the discharge opening 129, where the powder and any lumps or foreign material which is picked up thereby fall onto the vibrating sieve 142. The sifted powder falls through the sieve into the feed end of the bin 156 where it is conveyed by the worm 166 to the elevator housing 181 to repeat its cycle of travel. Additional powder C is periodically added to the bin 156 as it is consumed by the coated doughnuts D. The sieve 142 may be periodically removed and cleaned or replaced by a new sieve in the manner described above.

While there has been described and illustrated a preferred embodiment of the present invention, it is apparent that numerous alterations and omissions may be made without departing from the spirit thereof.

I claim:

1. An improved apparatus for applying a finely divided material to a comestible comprising a longitudinally extending rotatable drum having a feed opening and a discharge opening, means adjacent said discharge opening for separating the non-adhering finely divided material from the comestible, a bin located below said drum and extending longitudinally for substantially the full length of said drum and having a leading end and a trailing end disposed adjacent to the said drum discharge opening and feed opening respectively, a sifter located between said drum discharge opening and said bin leading end, a first endless conveyor adapted to transport finely divided material from the leading end toward the trailing end of said bin, and a second endless conveyor adapted to transport said finely divided material from the trailing end of said bin into the feed opening of said drum.

2. An improved coating apparatus in accordance with claim 1, wherein said sifter includes a vibrating screen located below the discharge end of said drum and above an opening communicating with the interior of said bin.

3. An improved coating apparatus in accordance with claim 1, wherein said drum is forwardly downwardly inclined and including means for adjusting the angle of inclination of said drum.

4. An improved coating apparatus in accordance with claim 1, including a transversely extending trough disposed below the discharge opening of said drum, said trough having an upwardly directed opening below the discharge opening of said drum and having formed in the base thereof a discharge opening confronting said sifter and a screw conveyor extending longitudinally along the base of said trough.

References Cited in the file of this patent

UNITED STATES PATENTS

| | | |
|---|---|---|
| 1,283,512 | Herr | Nov. 5, 1918 |
| 1,627,138 | Bausman | May 3, 1927 |
| 1,819,557 | Hunter | Aug. 18, 1931 |
| 1,958,808 | Zehender | May 15, 1934 |
| 1,963,005 | Wagner et al. | June 12, 1934 |
| 2,536,662 | Roth | Jan. 2, 1951 |
| 2,551,849 | Petrilli | May 8, 1951 |
| 2,761,420 | Mottet | Sept. 4, 1956 |

FOREIGN PATENTS

| | | |
|---|---|---|
| 74,327 | Denmark | June 23, 1952 |